US007248374B2

(12) United States Patent
Bridges (10) Patent No.: US 7,248,374 B2
(45) Date of Patent: Jul. 24, 2007

(54) SPHERICALLY MOUNTED LIGHT SOURCE WITH ANGLE MEASURING DEVICE, TRACKING SYSTEM, AND METHOD FOR DETERMINING COORDINATES

(75) Inventor: Robert E. Bridges, Kennett Square, PA (US)

(73) Assignee: Faro Laser Trackers LLC, Kennett Square, PA (US)

( * ) Notice: Subject to any disclaimer, the term of this patent is extended or adjusted under 35 U.S.C. 154(b) by 81 days.

(21) Appl. No.: 10/372,452

(22) Filed: Feb. 24, 2003

(65) Prior Publication Data

US 2003/0227616 A1 Dec. 11, 2003

Related U.S. Application Data

(60) Provisional application No. 60/358,930, filed on Feb. 22, 2002.

(51) Int. Cl.
*G01C 1/00* (2006.01)
*G01B 11/26* (2006.01)

(52) U.S. Cl. ............... 356/614; 356/139.08; 356/141.1

(58) Field of Classification Search ............... 356/614, 356/139.01, 139.03, 139.07, 139.08, 139.1, 356/141.1, 141.2, 4.09, 141.4, 138
See application file for complete search history.

(56) References Cited

U.S. PATENT DOCUMENTS 4,202,321 A * 5/1980 Volna .................. 126/605
4,820,041 A * 4/1989 Davidson et al. .......... 356/3.12
4,912,336 A * 3/1990 Nayar et al. ............ 250/559.17
4,977,488 A * 12/1990 Spotts et al. ............ 362/183

(Continued)

FOREIGN PATENT DOCUMENTS

EP   0 895 096 A2   2/1999

(Continued)

OTHER PUBLICATIONS

International Search Report, Feb. 24, 2003; PCT/US03/05581.

*Primary Examiner*—Sang H. Nguyen
(74) *Attorney, Agent, or Firm*—Cantor Colburn LLP (57) ABSTRACT

A device for use in conjunction with a coordinate measuring device, a three-dimensional coordinate measuring system and a method of measuring three-dimensional coordinates are described. The device includes a light source mounted substantially within the center of a spherical member having a spherical surface configured such that the distance from the light source to the outer contact surface of the sphere is substantially equal to the radius of the sphere regardless of sphere orientation. The three-dimensional coordinate measuring system further includes a coordinate-measuring device, the coordinate-measuring device configured to track the movement of the light source and to measure either azimuth angles and zenith angles, or to spherically encode tracking information related to relevant positions of the light source. The present method includes emitting light at a target with a light source, wherein the light source is mounted substantially within the center of a spherical member having a spherical surface configured such that the distance from the light source to the outer contact surface of the sphere is substantially equal to the radius of the sphere regardless of sphere orientation, moving the surface of the spherical member across a device to be measured, tracking said light source with a tracking device, and measuring information related to the relative position of the light source using either angular or spherical encoders.

18 Claims, 8 Drawing Sheets

U.S. PATENT DOCUMENTS

| | | | |
|---|---|---|---|
| 5,305,091 A | 4/1994 | Gelbart et al. | 356/375 |
| 5,430,539 A * | 7/1995 | Lysen | 356/152.1 |
| 5,530,549 A * | 6/1996 | Brown | 356/622 |
| 5,757,499 A * | 5/1998 | Eaton | 356/620 |
| 5,771,978 A * | 6/1998 | Davidson et al. | 172/4.5 |
| 5,861,956 A * | 1/1999 | Bridges et al. | 356/614 |
| 5,907,395 A | 5/1999 | Schulz et al. | 356/139.03 |
| 5,920,394 A | 7/1999 | Gelbart et al. | 356/375 |
| 6,049,378 A * | 4/2000 | Busch et al. | 356/138 |
| 6,069,700 A * | 5/2000 | Rudnick et al. | 356/511 |
| 6,388,755 B1 | 5/2002 | Zhao et al. | 356/614 |
| 6,693,706 B2 * | 2/2004 | Kahle et al. | 356/141.3 |
| 6,870,605 B2 * | 3/2005 | Osawa et al. | 356/4.09 |

FOREIGN PATENT DOCUMENTS

| | | |
|---|---|---|
| GB | 2 285 550 A | 7/1995 |
| JP | 2000258246 A * | 9/2000 |
| WO | WO 97/23787 | 7/1997 |

* cited by examiner

SPHERICALLY MOUNTED LIGHT SOURCE WITH ANGLE MEASURING DEVICE, TRACKING SYSTEM, AND METHOD FOR DETERMINING COORDINATES

CROSS REFERENCE TO RELATED APPLICATIONS

The present application claims priority to U.S. Provisional Patent Application Ser. No. 60/358,930, filed Feb. 22, 2002, the entire contents of which are specifically incorporated herein by reference.

BACKGROUND

The present disclosure relates to a light-source assembly used in conjunction with tracking, angle-measuring devices to determine coordinates of points or surfaces.

An instrument commonly referred to as a laser tracker has the ability to measure the coordinates of a point by sending a laser beam to a retroreflector target that is in contact with the point. A laser tracker is often used in conjunction with a particular type of retroreflector target called the spherically mounted retroreflector (SMR). The SMR comprises a cube-corner mounted within a sphere with the vertex of the cube-corner at the sphere center. A gimbal mechanism within the laser tracker directs a laser beam from the tracker to the SMR. Part of the light retroreflected by the SMR enters the laser tracker and passes onto a position detector. A control system within the laser tracker uses the position of the light on the position detector to adjust the rotation angle of mechanical azimuth and zenith axes of the laser tracker to keep the laser beam centered on the SMR. In this way, the laser beam is able to track an SMR that is moved over the surface of an object of interest. Part of the light retroreflected into the laser tracker passes onto a distance-measuring device such as an interferometer or absolute distance meter (ADM). Angular encoders attached to the mechanical azimuth and zenith axes of the tracker measure the azimuth and zenith angles of the laser beam (with respect to the tracker frame of reference). The one distance and two angles measured by the laser tracker are sufficient to completely specify the three-dimensional location of the SMR.

The cube-corner retroreflector embedded within the sphere in the SMR comprises three mutually perpendicular reflecting surfaces. These three reflecting surfaces occupy three of the six faces of a cube. The diagonal of this cube is the axis of symmetry of the cube corner and, hence, also the axis of symmetry of the SMR. To avoid problems caused by optical effects such as vignetting, the axis of symmetry of the SMR must ordinarily be aligned to within about 40 degrees of the incident laser beam. Because of this limitation, it is difficult to make certain types of measurements with an SMR. For example, it is difficult to measure the coordinates of an SMR attached to a machine tool that is moved over a large distance or rotated over a large angle. As another example, it is sometimes desirable to simultaneously measure a target with several widely separated laser trackers to improve measurement accuracy. However, the SMR is impractical for such measurements because of its limited angle of acceptance. Furthermore, in most applications, the SMR is carried by hand over the surfaces of interest. If the SMR is tilted too far from the laser beam, the tracker measurement will be interrupted until the SMR is rotated back into position. If an interferometer is being used to measure the distance, then it will be necessary to move the SMR back to a reference position before resuming the measurement. Such interruptions can be annoying and time consuming.

In most laser trackers today, the accuracy of the distance and angle measurements is approximately proportional to the distance of the SMR from the laser tracker, with the constant of proportionality given in units of micrometers/meter or, equivalently, in parts per million (ppm). State-of-the-art laser trackers in a typical environment have a radial accuracy, determined by the accuracy of the interferometer or ADM, of approximately 2 ppm. Today, these same trackers have an angular accuracy, determined by a variety of factors including the accuracy of the angular encoders, of approximately 10 ppm. In other words, the main source of error in most measurements is angular rather than radial. The angular accuracy of the laser tracker could be improved to approach the radial accuracy by using larger and more expensive angular encoders together with air bearings, and a stiffer, a thermal mechanical structure. However, a laser tracker modified in this way would be noisier, less portable, and much more expensive than trackers available today. Rather than increase the cost of the laser tracker, it would be preferable to reduce cost while maintaining or improving measurement accuracy.

To measure three-dimensional coordinates, an alternative to the retroreflector target is a point source of light formed by sending light out of an optical fiber and through a dispersing element. Schultz et al. describe this type of target in patent number U.S. Pat. No. 5,907,395.

SUMMARY

The above and other disadvantages of the art are overcome and alleviated by the present device for use in conjunction with a coordinate measuring device, the present three-dimensional coordinate measuring system and the present method of measuring three-dimensional coordinates. The device includes a light source mounted substantially within the center of a spherical member having a spherical surface configured such that the distance from the light source to the outer contact surface of the sphere is substantially equal to the radius of the sphere regardless of sphere orientation. The three-dimensional coordinate measuring system further includes a coordinate-measuring device, the coordinate-measuring device configured to track the movement of the light source and to measure either azimuth angles and zenith angles, or to spherically encode tracking information related to relevant positions of the light source. The present method includes emitting light at a target with a light source, wherein the light source is mounted substantially within the center of a spherical member having a spherical surface configured such that the distance from the light source to the outer contact surface of the sphere is substantially equal to the radius of the sphere regardless of sphere orientation, moving the surface of the spherical member across a device to be measured, tracking said light source with a tracking device, and measuring information related to the relative position of the light source using either angular or spherical encoders.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION

Reference will now be made in detail to exemplary embodiments, examples of which are illustrated in the accompanying drawings. The present disclosure illustrates a new way of measuring three-dimensional coordinates by means of a new type of target and a new type of coordinate-measuring device. The target comprises a point light source that is mounted in the center of a spherical surface. As the spherically mounted light source (SML) 20 is moved, the two trackers follow the light-source movement, each simultaneously measuring the azimuth and zenith angles of the SML 20. These two azimuth angles and two zenith angles are sufficient to determine the three-dimensional location of the point light source. The traditional method of measuring angles is to mount angular encoders to the azimuth and zenith axes. An alternative method, given in the first embodiment below, is to use one spherical encoder rather than two angular encoders to reduce cost while improving angular accuracy.

Figure 1:
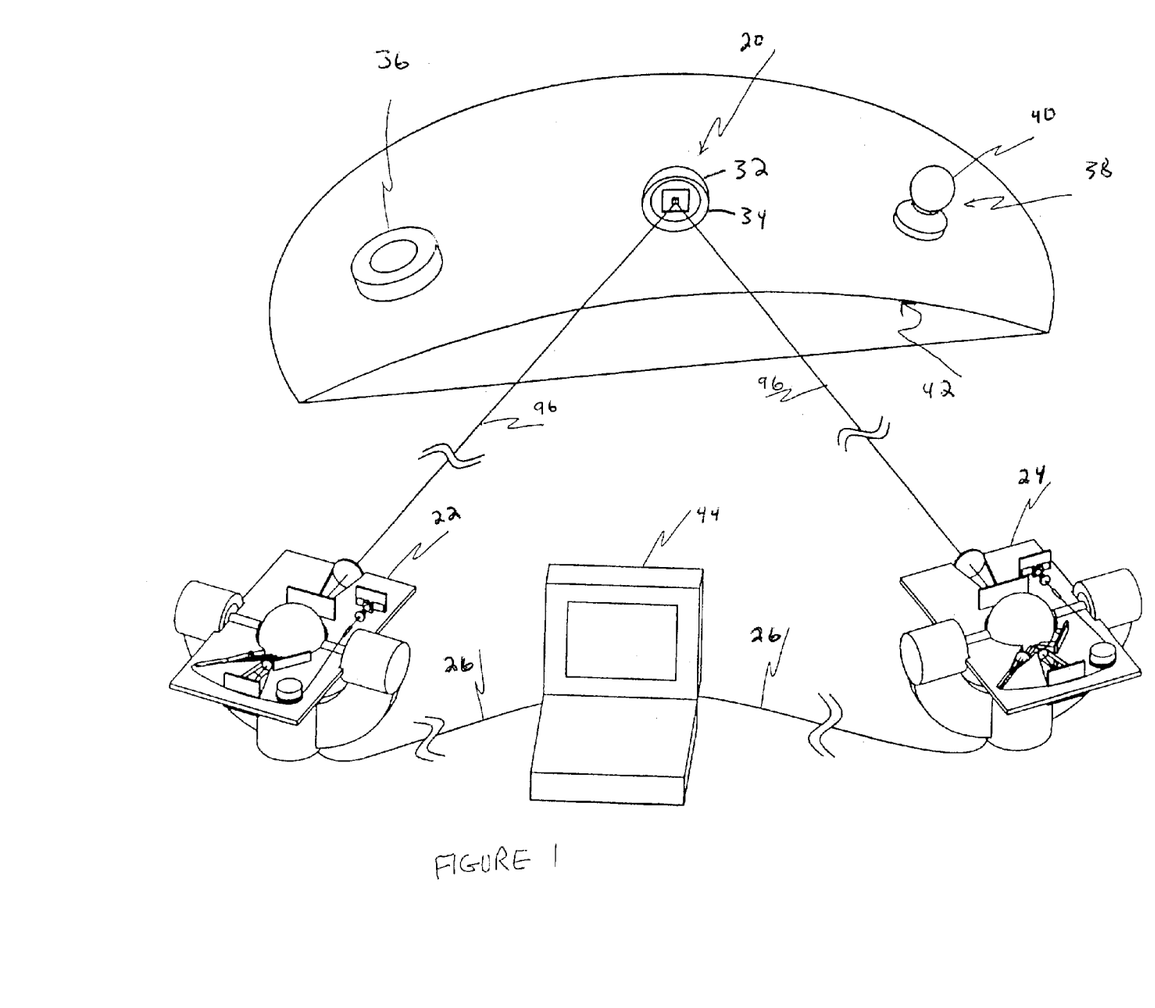
FIG. 1 depicts an embodiment of two trackers that follow the movement of a spherically mounted light source (SML) and determine its three-dimensional coordinates.

FIG. 1 shows a perspective view of two trackers 22, 24 following the movement of a spherically mounted light source (SML) 20. The two trackers 22, 24 each measure the azimuth and elevation angles of the SML 20 at the same instant in time. Synchronization is provided by a signal sent from one tracker to the other on an electrical wire 26 or a wireless carrier. Whenever the two trackers 22, 24 are moved to new positions, it is necessary to perform a procedure to determine the location and orientation of each tracker within a global frame of reference. The procedure includes simultaneously measuring the azimuth and zenith angles from each of the two trackers 22, 24 to the SML 20 with the SML 20 at a variety of different distance and angles relative to the two trackers 22, 24. For the sake of simplicity, the origin (x=0, y=0, z=0) and orientation (direction of the x, y, and z axes) of the global frame of reference are set equal to origin and orientation of the first tracker 22. The position and orientation of the second tracker 24 within the global frame of reference is fully characterized by three translational and two orientational degrees of freedom, for a total of five degrees of freedom. Each simultaneous measurement of the azimuth and zenith angles of the two trackers 22, 24 provides information on four degrees of freedom. Locating the SML 20 requires three degrees of freedom, so each simultaneous measurement provides information on one additional degree of freedom. In other words, each measurement provides redundant information. By making simultaneous measurements at a variety of locations, the five degrees of freedom needed to completely specify the relative positions and orientations of the two trackers 22, 24 can be determined. The mathematical procedure to do this is to select the five unknown position and orientation values in such a way as to minimize the sum of the squared errors determined from the collected data. The number of measurements required to accurately determine the location and orientation of the second tracker within the global frame of reference will depend on the locations selected for the SML 20 measurements; however, in most cases, 15 to 20 measurements will be sufficient.

Figure 2:
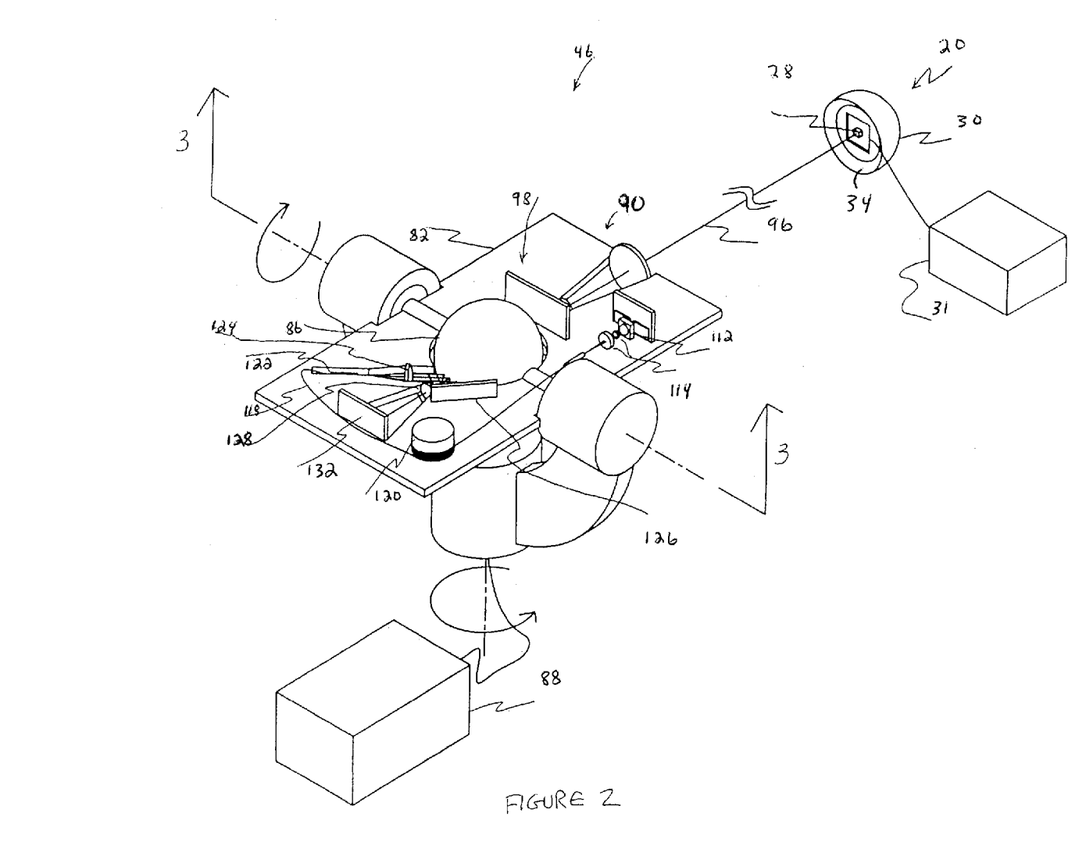
FIG. 2 depicts in a perspective view the major elements of the tracker and the SML.

As shown in FIGS. 1 and 2, the SML 20 includes a light source 28 centered within a spherical surface 30. The SML 20 shown in FIGS. 1 and 2 includes a metal ball 32 having the shape of a hemisphere with a lip 34 extending along the edges to increase the spherical surface area. However, the particular shape of the metal ball 32 is not important as long as the outer surface is spherical and the source of light 28 is located at the center of the sphere. The reason for locating the light source at the center of the sphere is to make the distance from the light source to the point of contact of the sphere equal to the radius of the sphere regardless of the sphere orientation. This property makes it easy to find the coordinates of a surface 42. The SML 20 is moved across the surface while the two trackers collect coordinates of the sphere center. The coordinates of the surface are found by moving each of the collected points by a perpendicular distance equal to the sphere radius.

Besides measuring surface coordinates, the SML 20 can also be used to determine fiducial points such those established by the kinematic nest 36 or the tooling ball 38 shown in FIG. 1. In a properly constructed kinematic nest, the center of the SML 20 returns to essentially the same place each time the sphere is removed and replaced in the nest. In a common type of nest 36, three pads provide support for the spherical surface and a permanent magnet holds the metal sphere in place. By placing the light source 28 in the center of the spherical surface 30, measurements of the SML 20 result in consistent coordinate values regardless of the orientation of the SML 20 within the nest 36. The tooling ball 38 includes a spherical surface 40 mounted on a shaft (not shown). The shaft fits tightly inside a hole in the object under investigation, and the sphere 40 sits a fixed distance above the object's surface. The fiducial point is defined as the center of the tooling ball sphere 40. This coordinates of this fiducial point are determined by moving the SML 20 across the surface of the tooling ball while the trackers collect coordinates. The fiducial point is found by locating the center of the spherically distributed collection of points. Again, it is important that the light source be centered within the spherical surface to correctly determine the location of the fiducial point.

The light source 28 in the SML 20 can be of any type but should preferably be small so that it appears as a point source of light. It is also preferable that its emission pattern be nearly hemispherical and its optical power be large enough at all angles. A good choice for the light source is the red High-Flux Surface Mount LED, part number HSMB-HR00-R1T20, manufactured by LumiLeds. For this LED, the normalized intensity varies smoothly from a maximum at normal incidence to 10% of this value at a half-angle of 80 degrees. This relatively high optical power at large angles permits good performance of the trackers described in these embodiments to distances of 30 meters over a full angle of 160 degrees (nearly a hemisphere). The LED described above requires an average cuiTent of 20 milliamps, which is provided through a separate power supply box 31 shown in 2. This box 31 may contain a battery or it may contain power supply components that connect directly to the electrical power mains. The current is modulated by an electrical signal, preferably by a sinusoidal signal with a fixed frequency in the range of 10 kHz to 100 kHz. The depth of modulation is preferably between 80 and 100 percent.

Data from the trackers 22, 24 are sent to a computer 44 or microprocessor for analysis. Data may be sent over electrical wires 26 as shown in FIG. 1 or through a wireless carrier.

Figure 3:
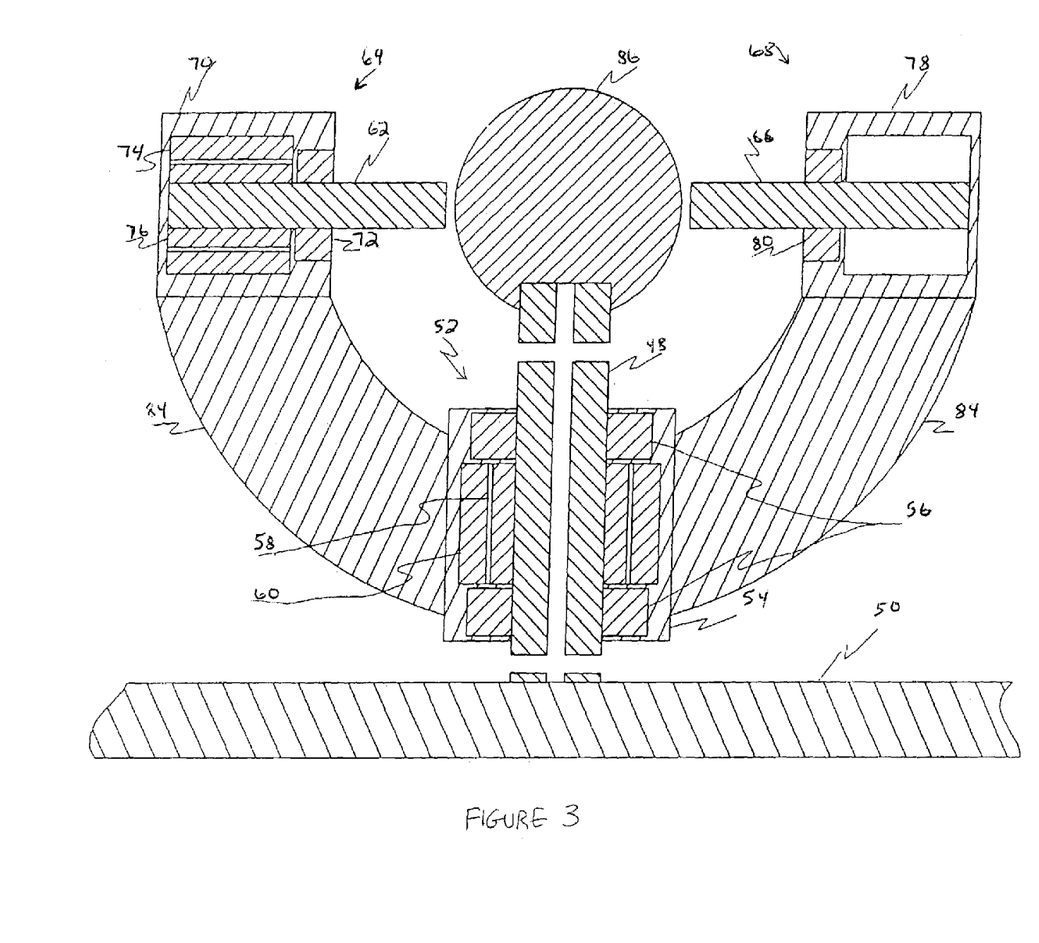
FIG. 3 depicts in a cross-sectional view the major elements of the tracker beam-steering system.

FIG. 2 shows an enlarged perspective view of a tracker 46 and the SML 20. A section view 3—3 through the center of the tracker is shown in FIG. 3. The central shaft 48 is bolted or otherwise attached to a solid structure 50, such as an instrument stand. The azimuth axis assembly 52 comprises azimuth-axis housing 54, azimuth-axis bearings 56, azimuth-axis motor stator 58, and azimuth-axis motor rotor 60. The azimuth-axis motor stator 58 is attached to the central shaft 48 and includes coil windings that form an electromagnet when electrical current is applied. The azimuth-axis motor rotor 60 is attached to the azimuth-axis housing 54 and includes a series of permanent magnets. These permanent magnets move in the azimuth direction in response to the changing magnetic field produced by the azimuth-axis motor stator 58. Azimuth-axis bearings 56 allow the azimuth-axis housing 54 to turn smoothly with a minimum of friction. The left zenith-axis shaft 62 passes through the center of the left zenith-axis assembly 64, and the right zenith-axis shaft 66 passes through the center of the right zenith-axis assembly 68. Left zenith-axis assembly 64 comprises left zenith-axis housing 70, left zenith-axis bearing 72, zenith-axis motor stator 74, and zenith-axis motor rotor 76. Right zenith-axis assembly 68 comprises right zenith-axis housing 78 and right zenith-axis bearing 80. As shown in FIG. 2, the mounting plate 82 attaches to the inner portions of the left 62 and right 66 zenith-axis shafts. Left 72 and right 80 zenith-axis bearings allow the rigid structure comprising the left and right zenith-axis shafts and the mounting plate to turn smoothly with low friction. The zenith-axis motor stator 58 is attached to the left zenith-axis housing 70 and includes coil windings that form an electromagnet when electrical current is applied. The zenith-axis motor rotor 60 is attached to the left zenith-axis housing 70 and includes a series of permanent magnets. These permanent magnets move in the zenith direction in response to the changing magnetic field produced by the zenith-axis motor stator 74. The left 70 and right 78 zenith-axis housings are attached to the azimuth-axis housing 54 by wing supports 84.

The central shaft 48 is attached to the solid structure 50 and is stationary within the global frame of reference described above. The encoder sphere 86, which is attached to the central shaft 48, is also stationary in the global frame of reference. Azimuth-axis housing 54, wing supports 84, and left 70 and right 78 zenith axis housings all turn in the azimuth direction in response to electrical current applied to the azimuth-axis motor stator 58. The rigid structure comprising the left 62 and right 66 zenith-axis shafts and the mounting plate 82 all turn in the zenith direction in response to electrical current applied to the zenith-axis motor stator 74. The mechanical structure shown in FIG. 3 is an example of a gimbal mount because there is a central point of rotation, also called the gimbal point that is independent of the azimuth and zenith angles. This central point of rotation is found at the intersection of the centerline of the central shaft and the centerlines of the left and right zenith-axis shafts. To route electrical wires to and from the electrical components attached to the mounting plate 82, horizontal and vertical holes are drilled into the central shaft 48. Electrical wires are first wrapped in loops around the upper part of the central shaft, then routed through the upper horizontal hole, into the vertical hole, and out of the lower horizontal hole to the electronics box 88 shown in FIG. 2.

Figure 4:
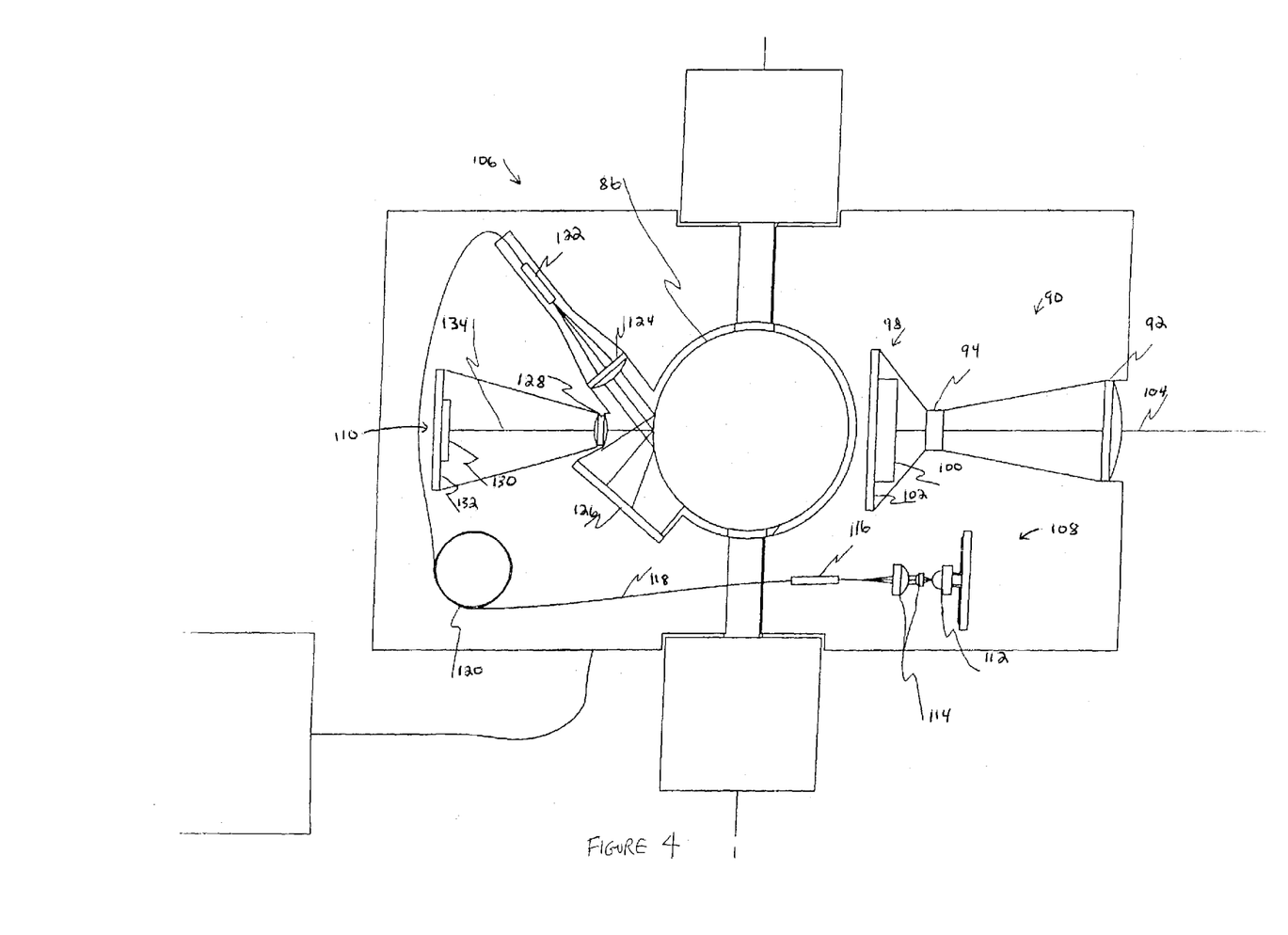
FIG. 4 depicts in a top view the major elements of the tracker.

As shown in FIGS. 2 and 4, the afocal beam-reducer assembly 90 includes a first positive (convex) lens 92 followed by a second lens 94, which may be either positive or negative (concave), with the distance between the first 92 and second 94 lenses equal to the sum of the focal lengths of the two lenses. The magnification of the beam-reducer assembly 90 is equal to the ratio of the focal length of the second lens 94 to the focal length of the first lens 92. For example, if the focal length of the first lens 92 is 50 mm and the focal length of the second lens 94 is −5 mm, then the lenses are separated by 45 mm and the magnification is −1/10. The diameter of the first lens 92 is generally much smaller than the distance from the gimbal point to the SML 20. Consequently, the rays of light 96 arriving at the first lens 92 from the SML 20 are nearly parallel, which will result in rays of light 96 emerging from the second lens 94 that are also nearly parallel. If the clear aperture (diameter) of the first lens 92 is 25 mm, then the diameter of the bundle of light rays 96 exiting the second lens 94 will equal the initial diameter divided by the absolute value of the magnification, or 25/10=2.5 mm. The centers of the first 92 and second 94 lenses and the center of the position detector are all aligned with the gimbal point.

The position detector assembly 98 includes a position detector 100 mounted on a circuit board 102, with electrical wires running from the circuit board 102 to additional electrical components within the electronics box 88. Although any type of position detector 100 can be used, including a lateral-effect cell or a photosensitive array, a quadrant detector is may be desired because of its high sensitivity, high speed, low cost, and simplicity. A good choice for the quadrant detector is the SPOT-4D manufactured by UDT Sensors, Inc. The quadrant detector comprises four separate electrical detector segments closely spaced into quadrants. The electrical signal from each of the four detector segments is attached to its own transimpedance amplifier. The electrical signal from each transimpedance amplifier is sent through a band-pass filter and then into an amplitude meter. The amplitude meter has the ability to measure the amplitude of the sinusoidal signal at the modulation frequency of the light source while rejecting other signals. The amplitude meter may he implemented either with analog circuitry or with analog-to-digital converters followed by digital signal processing hardware. The left-right position of the spot of light that strikes the quadrant detector is found by calculating the relative voltage difference between the two leftmost detectors and the two rightmost detectors. Similarly, the up-down position of the spot of light that strikes the quadrant detector is found by calculating the relative voltage difference between the two uppermost and the two lowermost detectors. An electrical control system located within the electronics box uses the calculated left-right and up-down positions to adjust the rotation angles of the azimuth and zenith axis assemblies to keep the spot of light centered on the quadrant detector.

The line connecting the gimbal point with the center of the position detector 100 and the centers of the first 92 and second 94 lenses of the beam reducer 90 is referred to as the tracker optical axis 104. The spherical encoder assembly is used to measure the azimuth angle and zenith angle of the tracker optical axis relative to a frame of reference that is fixed with respect to the central shaft and encoder sphere. The spherical encoder can be absolute or incremental, reflective or transmissive, and imaging or diffracting. The present embodiment describes a spherical encoder of the absolute, reflective, imaging type.

The spherical encoder assembly 106 comprises the encoder sphere 86, the beam-illumination assembly 108, and the beam-imaging assembly 110. The encoder sphere 86 is centered on the gimbal point. The surface of the encoder sphere 86 is covered with regularly spaced, diffusely reflecting squares, referred to as fiducial squares, whose edges are curved to conform to the spherical surface. The fiducial squares are placed on a dark (absorptive) background and are centered on the sphere surface at predetermined azimuth and zenith angles. Additional, smaller squares, referred to as indexing squares, are placed between the fiducial squares. There are several potential indexing locations between each pair of fiducial squares. Within these potential indexing locations, some of the indexing squares are made to reflect light, thereby making them logical ones, while other squares are made to absorb light, making them logical zeros. The logical ones and zeroes at any particular location on the surface of the sphere are decoded in binary to determine the identity of the corresponding fiducial squares.

The beam-illumination assembly 108 comprises the light source 112, fiber-coupling optics 114, source ferrule 116, single-mode optical fiber 118, mandrel 120, launch ferrule 122, collimating lens 124, and beam block 126. The purpose of the beam-illumination assembly 108 is to illuminate a small part of the surface of the encoder sphere 86 with visible light that varies smoothly over the illuminated region of the sphere 86. The light source 112 is preferably a high-flux LED with a coherence length that is small enough to eliminate the deleterious effects of speckle in the light reflected off the sphere surface. A good choice for the light source is the red SnapLED 70, part number HPWT-FHOO, manufactured by LumiLeds. This LED emits light that is nearly Gaussian in its transverse spatial profile, thereby helping to obtain high-efficiency coupling into the single-mode optical fiber 118. The fiber-coupling optics 114 comprises one or more lenses. To obtain efficient coupling, these lenses place the beam waist of the focused light near the entrance face of the optical fiber 118, and they adjust the diameter of the beam waist to approximately equal the mode field diameter of the fiber. The optical fiber 118 is epoxied within the source ferrule 116, and the end of the fiber is polished. Not far from the source end of the optical fiber, the optical fiber 118 is wrapped several times about a mandrel 120 (cylinder). The purpose of this wrapping is to improve the smoothness of the spatial profile within the optical fiber 118. The wrapping of the optical fiber 118 into a small loop tends to remove those portions of the electric field within the fiber that do not conform to the lowest-order mode, which is a smooth mode having a nearly Gaussian transverse profile. In other words, the optical fiber 118 and mandrel wrap 120 act as a spatial filter that removes undesirable field components. The end of the optical fiber 118 is epoxied into the launch ferrule 122, and the end of the fiber is polished smooth. Light diverges from the optical fiber with a smooth, consistent transverse profile. It is collimated by the collimating lens 124 and strikes the surface of the encoder sphere 86. The surface regions of the encoder sphere 86 are designed to be absorptive or diffusely reflective. However, a fraction of the reflected light is unavoidably specular, and a beam block is provided to absorb this light. An effective beam block can be constructed out of absorbing (neutral density) glass with an antireflective coating on the front surface.

The beam-imaging assembly 110 comprises the imaging lens 128, photosensitive array 130, and circuit board 132. The imaging lens 128 forms an image on the photosensitive array 130 corresponding approximately to the illuminated pattern on the surface of the encoder sphere 86. The photosensitive array 130 may be a CCD, CMOS, CID, or similar device. The pattern on the photosensitive array 130 is analyzed by a computer, microprocessor, or digital signal processor (DSP) located on the circuit board 132 or in the electronics box 88. The optical axis of the imaging lens 134 is aligned with the tracker gimbal point.

The first step in converting the pattern on the photosensitive array 130 into an azimuth and elevation angle is to correct the electrical charge stored in each pixel of the photosensitive array 130 to account for variations in the amount of light reaching each pixel and being converted into a stored electrical charge. These variations have several causes: (1) non-uniform (approximately Gaussian) illumination pattern, (2) non-uniform radiance emitted across the surface of the sphere, and (3) non-uniform responsivity of pixels in the photosensitive array. These combined effects can be characterized by rotating the mounting plate over a small angular extent and noting the response of the each pixel to reflective and non-reflective regions. From these observations, it is possible to determine how each pixel in image space responds to the illumination incident at the corresponding point in object space. (Points in object space lie along the sphere surface.) The second step in converting the pattern into azimuth and zenith angles is to perform a numerical ray trace computation to find correction values for the centroid of the fiducial squares at each position on the photosensitive array. This correction accounts for defocus and distortion resulting from the curvature of the spherical surface, as well as aberrations from the optical components. When the corrections obtained from the two steps above are applied to the pattern on the photosensitive array, the azimuth and zenith angles are determined to relatively high accuracy. The accuracy can be improved further by carrying out an experimental procedure in which the indicated angle is compared to a known angular deviation. Such an angular deviation can be found by placing a retroreflector on a micrometer stage whose position transverse to the tracker is measured with a highly accurate linear encoder. This procedure can detect angular deviations of less than one microradian.

In the present (first) embodiment, a spherical encoder 86 is used to measure the azimuth and zenith angles. In the second embodiment that follows, angular encoders are attached to both mechanical axes. The use of angular encoders is well established, but the spherical encoders introduced here make possible higher accuracy at a reduced system cost. Unlike angular encoders, which measure the angles of the mechanical axes, the spherical encoder directly measures the angle of the mounting plate. Because of this, the deleterious effects of bearing wobble and structure bending are greatly reduced in the spherical encoder, permitting a less expensive mechanical assembly to be constructed. Furthermore, the spherical encoder described above can be made to be more accurate than the compact angular encoders commonly available today. For example, suppose that fiducial squares are placed approximately 3 degrees (approximately $1/20$ radian) apart on the surface of the sphere and that four of these squares map into a photosensitive array having 1000×1000 pixels. For systems of this sort, the centroid of a square can usually be located to an accuracy of $1/100$ of a pixel. A given centroid is therefore known to an accuracy of 4 squares*3 degrees/square*0.01745 radian/degree/(1000 pixels*100 parts/pixel)=2 microradians. If the centroid location is calculated for three of the four squares across the array and if the error is random so that it reduces as the square root of the number of measurements, then the accuracy of the azimuth and zenith angles is 2 microradians/sqrt (3)=1.2 microradians. This accuracy is comparable to the accuracy obtained with displacement interferometers that measure over large ranges in a relatively good (thermally stable) environment. If desired, the number of pixels in the photosensitive array 130 can be reduced while the number of fiducial squares on the sphere surface is increased (in proportion) without affecting angular accuracy.

Figure 5:
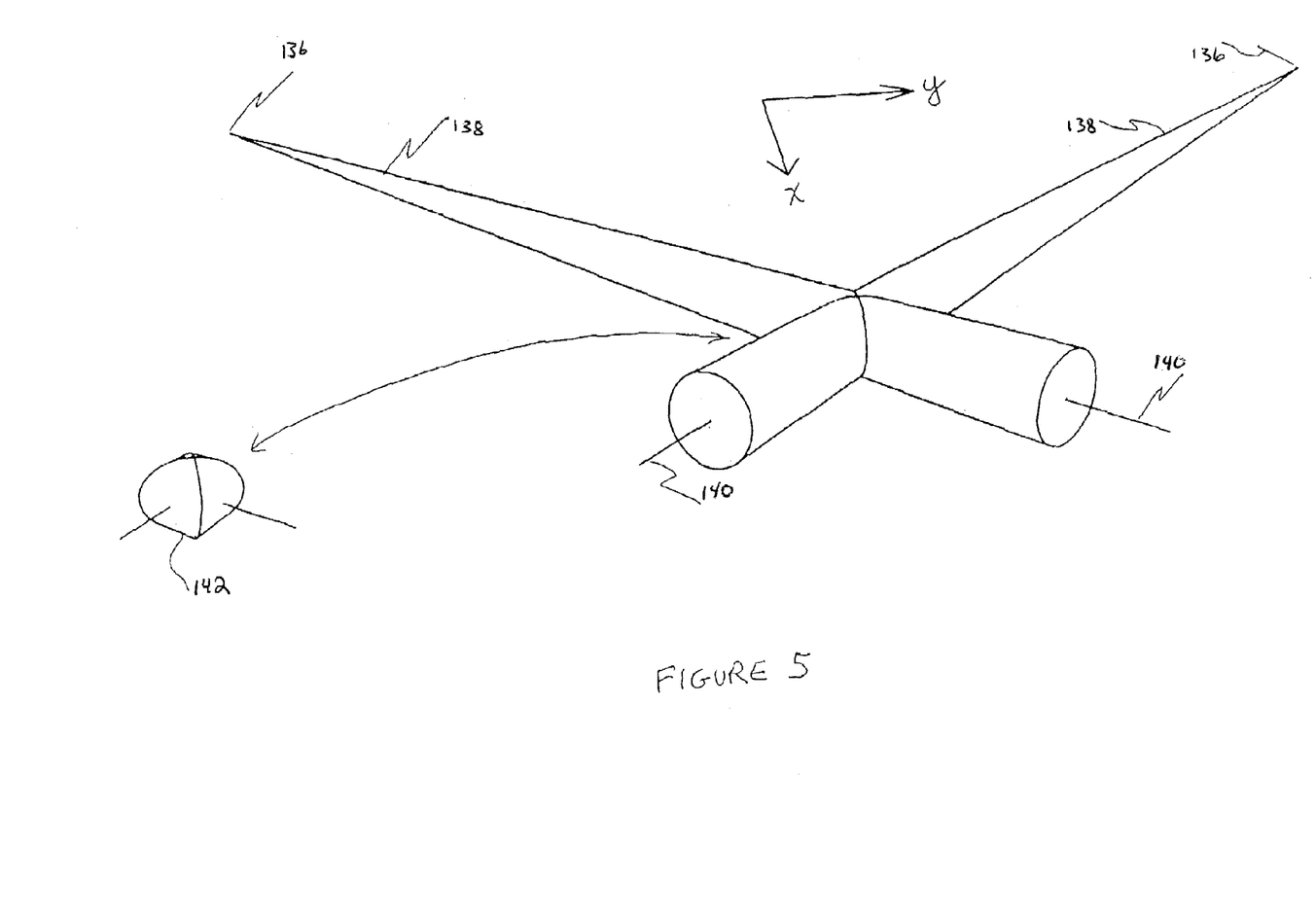
FIG. 5 illustrates in a perspective view the effect of angular error on measurement accuracy.

We now consider the accuracy of a measurement in which two trackers are used in combination to determine the coordinates of an SML 20 through the measurement of angles. FIG. 5 represents in perspective view the effect of angular error. Angular errors are approximately proportional to the distance from the tracker gimbal point to the center of the SML 20. For example, the calculation above suggests that the constant of proportionality is approximately 1.2 microradians, which is equivalent to 1.2 micrometers/meter or 1.2 ppm. The vertex 136 of each cone 138 in FIG. 5 corresponds to the location of the gimbal point of a tracker. The central line 140 that runs through each cone represents the true angle that a perfect tracker would measure. The region out to the surface of the cone represents the uncertainty in the angle measurement. The SML 20 is centered at the intersection of the two lines that run through the cone centers. The overall error in the measurement of the coordinates of the SML 20 is found by intersecting the two cones. This intersection (overlap) region 142 is shown in FIG. 5. In this, the y axis is pointed from one tracker to the other. The x axis is perpendicular to the y axis and lies in the plane that contains the lines at the centers of the cones.

Figure 6:
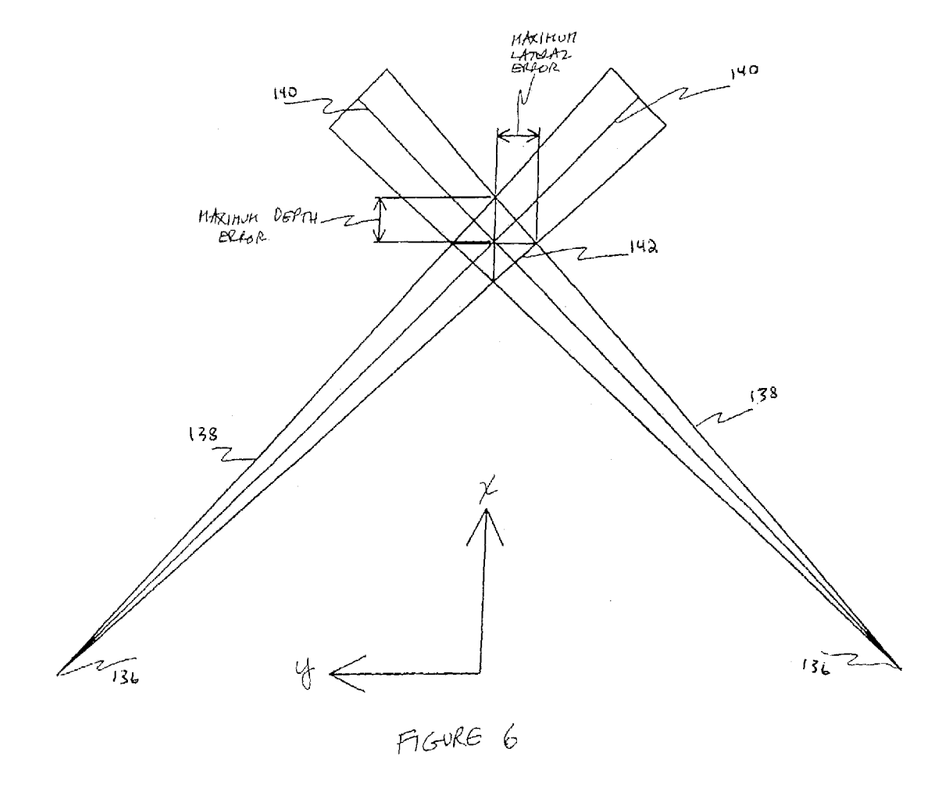
FIG. 6 illustrates in a top view the effect of angular error on measurement accuracy.

FIG. 6 represents in top view the effect of angular error. This view exposes the maximum error within the intersection region. It can be shown that the coordinate measurement is most accurate when the angle A shown in FIG. 5 is approximately 90 degrees. In this case, the maximum error is approximately equal to the angular error (1.2 micrometers per meter in this case) times the distance (from the tracker to the SML 20) times sqrt(2). For example, for a target located 5 meters from each tracker, the maximum error is approximately 5(1.2)(sqrt(2))=6.6 micrometers. In practice, there are some additional errors in the measurement (such as offset errors and compensation errors) that increase the overall error to some degree. Relatively good measurement accuracy can be maintained over angular separations A from 45 degrees to 135 degrees. At these extremes, the maximum angular measurement error increases (relative to the 90-degree case) by a factor of approximately 2.

Second Embodiment

Figure 7:
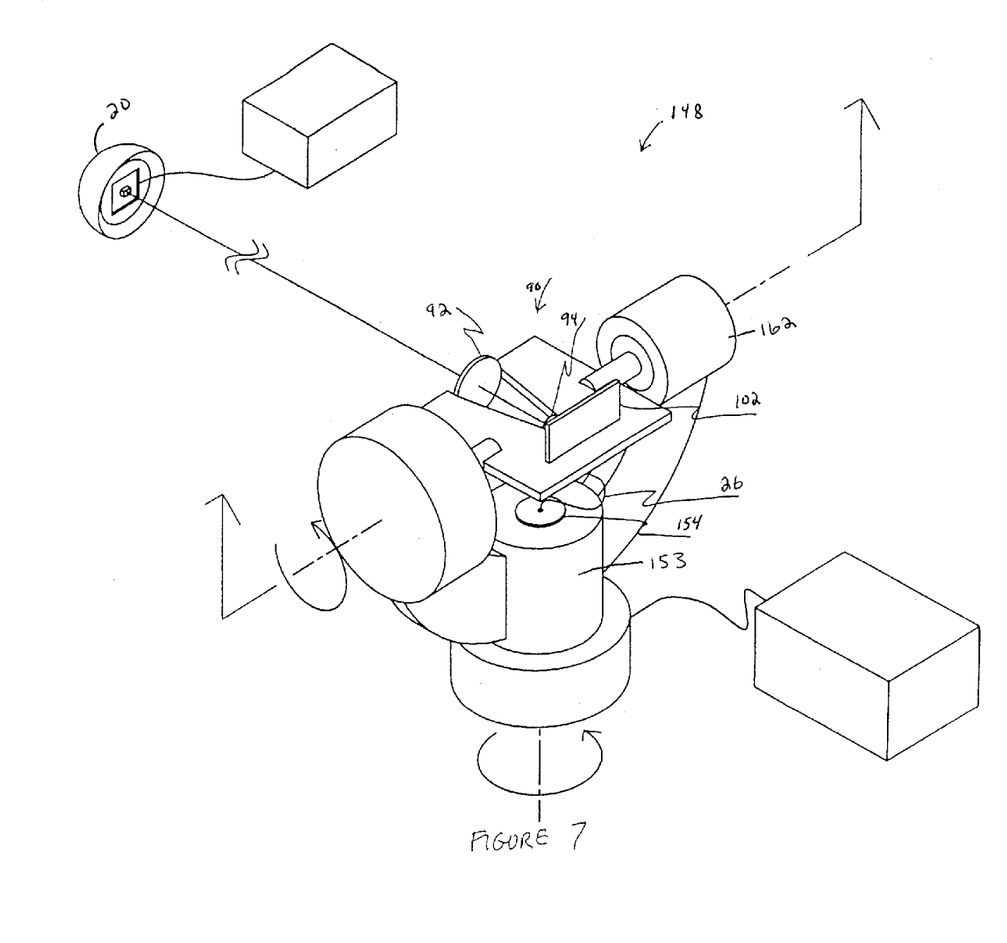
FIG. 7 depicts in a perspective view a second exemplary embodiment.
Figure 8:
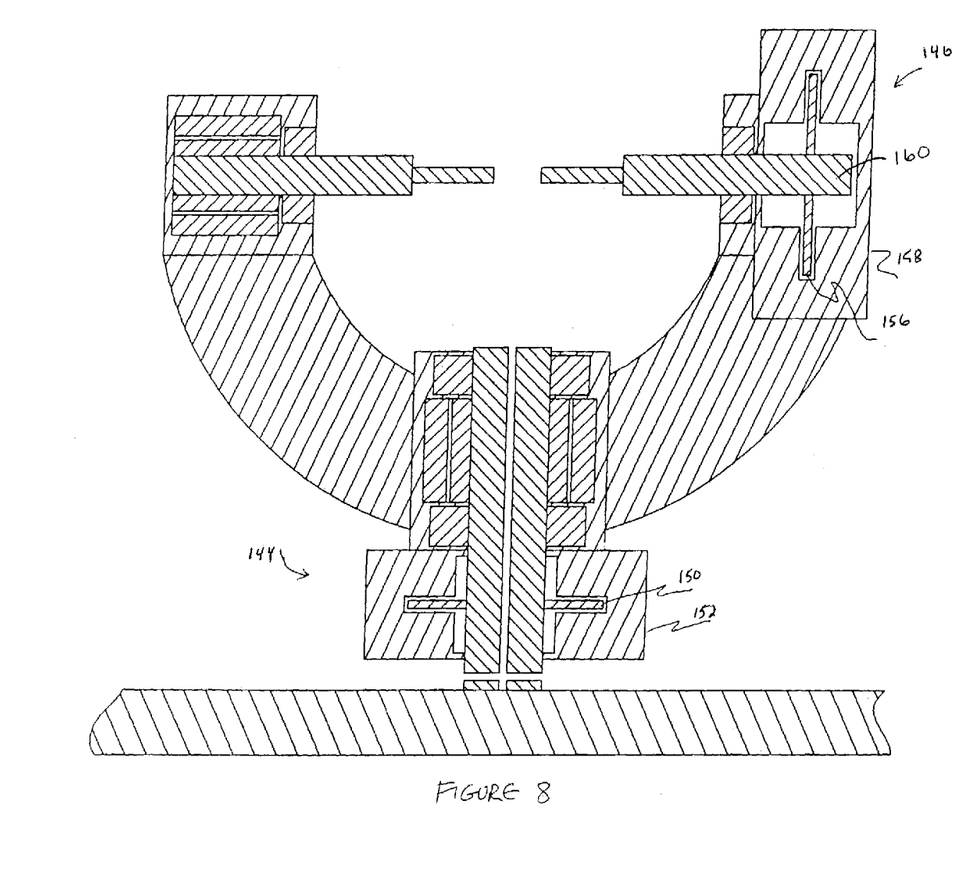
FIG. 8 depicts in a cross-sectional view of the major elements of the beam steering system of FIG. 7.

FIG. 7 shows a second exemplary embodiment, which is similar to the first embodiment except that the spherical encoder 106 has been replaced with two angular encoders 144, 146. A section view 8—8 drawn through the center of the tracker 148 is shown in FIG. 8. The azimuth encoder 144 comprises the azimuth-encoder disk 150 and the azimuth read-head assembly 152. The azimuth-encoder disk 150 is attached to the stationary central axis shaft 154, and the azimuth read-head assembly 152 is attached to the rotating azimuth-axis frame 153. The zenith encoder 146 comprises the zenith-encoder disk 156 and the zenith read-head assembly 158. The zenith-encoder disk 156 is attached to the zenith-axis shaft 160, which rotates in the zenith direction. The zenith read-head assembly 158 is attached to the zenith-axis frame 162, which does not rotate in the zenith direction. The mechanical structure, motors, and bearings are essentially identical to the components of FIG. 3. As shown in FIG. 7, the size of the mounting plate has been greatly reduced from the first embodiment. Potential advantages of the second embodiment relative to the first are better availability of optical encoders and reduced cost for systems in which the highest performance is not essential.

It will be apparent to those skilled in the art that various modifications and variations can be made in the spherically mounted light source and tracker of the present invention without departing from the spirit or scope of the invention.

What is claimed is:

1. A three-dimensional coordinate measuring system to measure the coordinates of an object surface, comprising:
 a light source mounted substantially within the center of a spherical member having an outer spherical contact surface configured such that the distance from the light source to the outer spherical contact surface is substantially equal to the radius of the spherical member regardless of spherical member orientation, wherein the outer spherical contact surface contacts the object surface; and
 at least one coordinate-measuring device, the coordinate-measuring device configured to track the movement of the light source and to measure either azimuth angles and zenith angles, or to spherically encode tracking information related to relevant positions of the light source.

2. The system in accordance claim 1 wherein two coordinate-measuring devices are configured to simultaneously measure azimuth and elevation angles of the light source positioned within the center of the spherical surface.

3. The system in accordance with claim 1, wherein the outer surface of spherical member comprises a metal material.

4. The system in accordance with claim 1 wherein the spherical member is generally shaped as a hemisphere.

5. The system in accordance with claim 1, wherein the spherical member has a lip extending along open edges of the outer spherical contact surface, wherein the lip is configured to increase the outer spherical contact surface area.

6. The system in accordance with claim 1, wherein the spherical member comprises a metal ball generally shaped as a hemisphere and including a lip around the edge of the hemisphere.

7. The system in accordance with claim 1, further including a kinematic nest, wherein the kinematic nest, the light source and the spherical member are configured such that the light source returns to substantially the same place each time the spherical member is removed and replaced within the kinematic nest.

8. The system in accordance with claim 1, further including a tooling ball, wherein the tooling ball, the light source and the spherical member are configured such that movement of the spherical member around the tooling ball substantially moves the light source equidistantly around the center of the tooling ball sphere.

9. The system in accordance with claim 1, wherein the light source is a point light source.

10. The system in accordance with claim 9, wherein the point light source generally has a hemispherical emission pattern.

11. The system in accordance with claim 1 further comprising an afocal beam-reducer assembly.

12. The system in accordance with claim 1, further comprising a position detector assembly.

13. The system in accordance with claim 12, wherein the position detector assembly is one of a lateral-effect cell, a photosensitive array, or a quadrant detector.

14. The system in accordance with claim 1, wherein the at least one coordinate-measuring device is configured to spherically encode tracking information related to relevant positions of the light source using a spherical encoder, and further wherein the spherical encoder is absolute or incremental, reflective or transmissive, and imaging or defracting.

15. The system in accordance with claim 14, wherein the spherical encoder comprises an encoder sphere, a beam-illumination assembly, and a beam-imaging assembly.

16. A method of measuring three-dimensional coordinates, comprising:
   emitting light at a target with a light source, wherein the light source is mounted substantially within the center of a spherical member having an outer spherical contact surface configured such that the distance from the light source to the outer spherical contact surface of the spherical member is substantially equal to the radius of the spherical member regardless of spherical member orientation;
   moving the outer spherical contact surface of the spherical member across a device to be measured, wherein the outer spherical contact surface contacts the device;
   tracking said light source with at least one tracking device; and
   measuring information related to the relative position of the light source using either angular or spherical encoders.

17. A three-dimensional coordinate measuring system to measure the coordinates of an object surface, comprising:
   a light source mounted substantially within the center of a spherical member having an outer spherical contact surface configured such that the distance from the light source to the outer spherical contact surface is substantially equal to the radius of the spherical member regardless of spherical member orientation, wherein the outer spherical contact surface contacts the object surface; and
   at least two coordinate-measuring devices, the at least two coordinate-measuring devices configured to track the movement of the light source and to measure either azimuth angles and zenith angles, or to spherically encode tracking information related to relevant positions of the light source.

18. A method of measuring three-dimensional coordinates, comprising:
   emitting light at a target with a light source, wherein the light source is mounted substantially within the center of a spherical member having an outer spherical contact surface configured such that the distance from the light source to the outer spherical contact surface of the spherical member is substantially equal to the radius of the spherical member regardless of spherical member orientation;
   moving the outer spherical contact surface of the spherical member across a device to be measured, wherein the outer spherical contact surface contacts the device;
   tracking said light source with at least two tracking devices; and
   measuring information related to the relative position of the light source using either angular or spherical encoders.

* * * * *